(12) United States Patent
Liu

(10) Patent No.: US 8,570,741 B2
(45) Date of Patent: Oct. 29, 2013

(54) POWER SUPPLY

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/118,484

(22) Filed: May 30, 2011

(65) Prior Publication Data

US 2012/0275114 A1 Nov. 1, 2012

(30) Foreign Application Priority Data

Apr. 28, 2011 (CN) .......................... 2011 1 0107891

(51) Int. Cl.
*H05K 7/20* (2006.01)

(52) U.S. Cl.
USPC ................. 361/695; 361/679.47; 361/679.48; 361/691; 361/694; 165/80.3; 165/121; 165/122; 454/184

(58) Field of Classification Search
USPC ......... 361/679.46–679.5, 690–695; 165/80.2, 165/80.3, 121–126, 104.33, 185; 454/184; 312/223.2, 223.3, 236; 411/339, 510
See application file for complete search history.

(56) References Cited

U.S. PATENT DOCUMENTS

| 5,316,423 | A | * | 5/1994 | Kin | 411/510 |
| 6,040,981 | A | * | 3/2000 | Schmitt et al. | 361/695 |
| 6,122,168 | A | * | 9/2000 | Cheng | 361/695 |
| 6,351,380 | B1 | * | 2/2002 | Curlee et al. | 361/695 |
| 6,866,577 | B2 | * | 3/2005 | Gough et al. | 454/184 |
| 6,995,979 | B2 | * | 2/2006 | Hsieh et al. | 361/695 |
| 6,999,313 | B2 | * | 2/2006 | Shih | 361/695 |
| 7,097,556 | B2 | * | 8/2006 | Su | 454/184 |
| 7,352,573 | B2 | * | 4/2008 | Wong | 361/695 |
| 7,384,210 | B2 | * | 6/2008 | Sura et al. | 403/168 |
| 7,466,545 | B2 | * | 12/2008 | Hung | 361/679.48 |
| 2007/0121290 | A1 | * | 5/2007 | Chou et al. | 361/695 |
| 2010/0182749 | A1 | * | 7/2010 | Su | 361/695 |
| 2012/0170219 | A1 | * | 7/2012 | Wu et al. | 361/695 |

FOREIGN PATENT DOCUMENTS

| CN | 201465018 U | * | 5/2010 | ............... G06F 1/20 |
| TW | 200726383 A | * | 7/2007 | ............... H05K 7/20 |

* cited by examiner

*Primary Examiner* — Michail V Datskovskiy
(74) *Attorney, Agent, or Firm* — Altis & Wispro Law Group, Inc.

(57) ABSTRACT

A power supply includes a main body, a fan, and a mounting bracket. The main body defines an opening therein. The mounting bracket for mounting the fan is detachably mounted to the main body to cover the opening. The fan is mounted on the mounting bracket and received in the main body through the opening.

4 Claims, 3 Drawing Sheets

POWER SUPPLY

BACKGROUND

1. Technical Field

The present disclosure relates to a power supply.

2. Description of Related Art

Power supplies in computers can generate lots of heat. In order to dissipate the heat, fans are installed in the power supplies. However, the fans are difficult to remove should they need maintenance or to be replaced, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
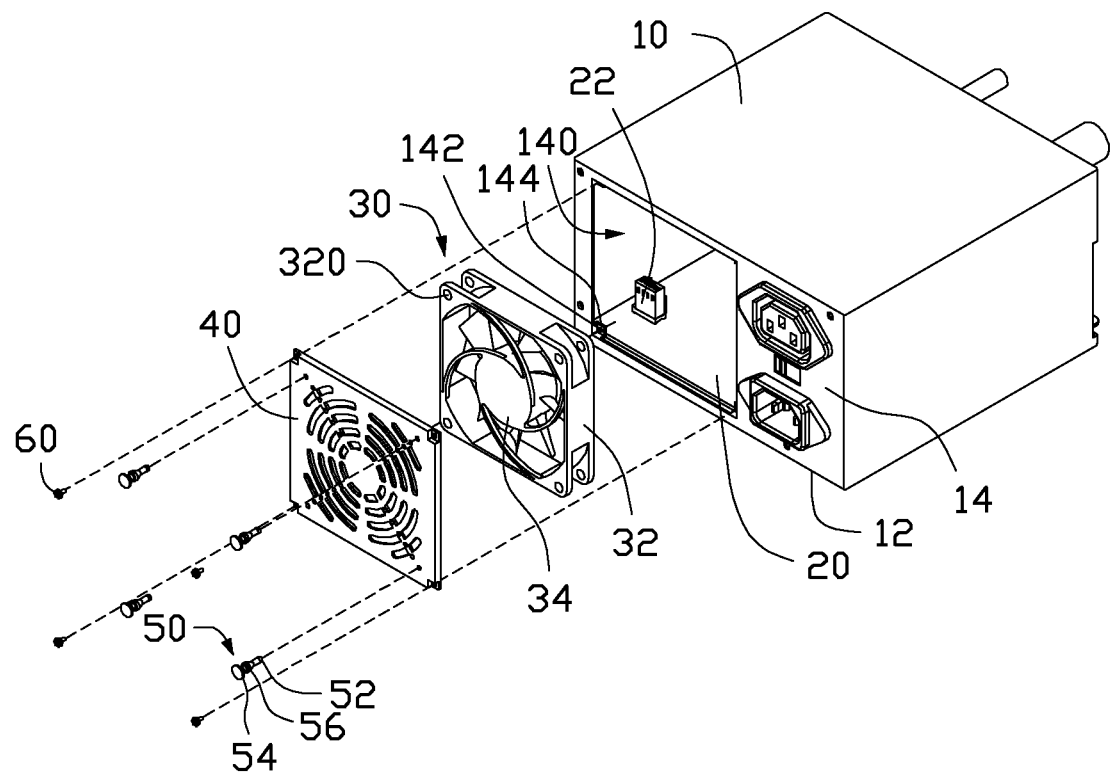
FIG. 1 is an exploded, isometric view of an exemplary embodiment of a power supply; the power supply includes a mounting bracket.

Referring to FIG. 1, an exemplary embodiment of a power supply includes a main body 10, a circuit board 20, a fan 30, a mounting bracket 40, a plurality of first fasteners 50, and a plurality of second fasteners 60. In this embodiment, each second fastener 60 is a bolt.

The main body 10 includes a bottom plate 12, and a lateral plate 14 substantially perpendicularly extending from a side of the bottom plate 12. The lateral plate 14 defines a substantially rectangular opening 140. Four mounting pieces 142 are formed on the lateral plate 14, respectively located at four corners of the opening 140. Each mounting piece 142 is recessed in the lateral plate 14, and defines a mounting hole 144.

The circuit board 20 is received in the main body 10, and supported on the bottom plate 12. A connector 22 is installed on the circuit board 20.

The fan 30 includes a shell 32 and a plurality of blades 34 mounted in the shell 32. Four corners of a first side of the shell 32 and four corners of a second side of the shell 32 opposite to the first side each define a mounting hole 320.

Figure 2:
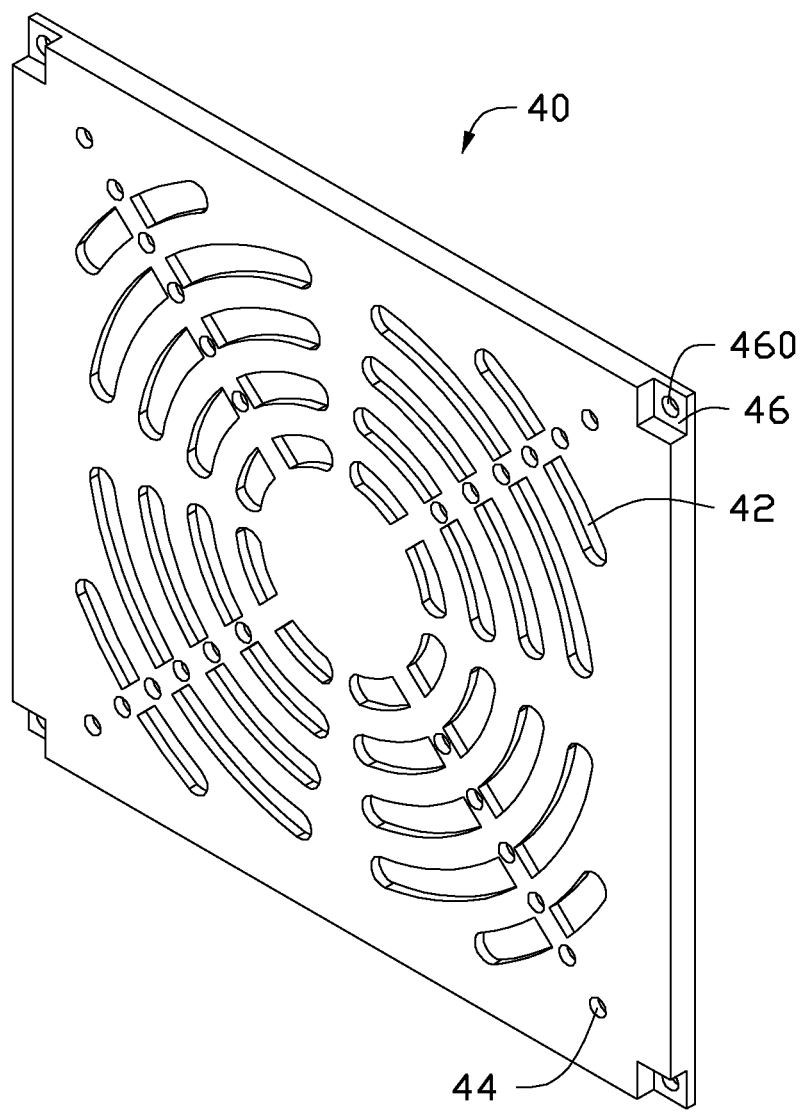
FIG. 2 is an enlarged, isometric view of the mounting bracket of FIG. 1.

Referring to FIG. 2, the mounting bracket 40 is substantially rectangular, and defines a plurality of vents 42, and a plurality of groups of first through holes 44 arranged in a cross shaped pattern from a center of the mounting bracket 40 to four corners of the mounting bracket 40 for mounting different size fans. Four corners of the mounting bracket 40 are recessed to form four recessed portions 46. Each recessed portion 46 defines a second through hole 460.

Referring to FIG. 1 again, in this embodiment, each first fastener 50 is made of elastic material, such as plastic. The first fastener 50 includes a shaft 52, a coin-shaped fastening portion 54 extending from one end of the shaft 52, and a tapered flange 56 extending from a circumference of the shaft 52 adjacent to the fastening portion 54.

Figure 3:
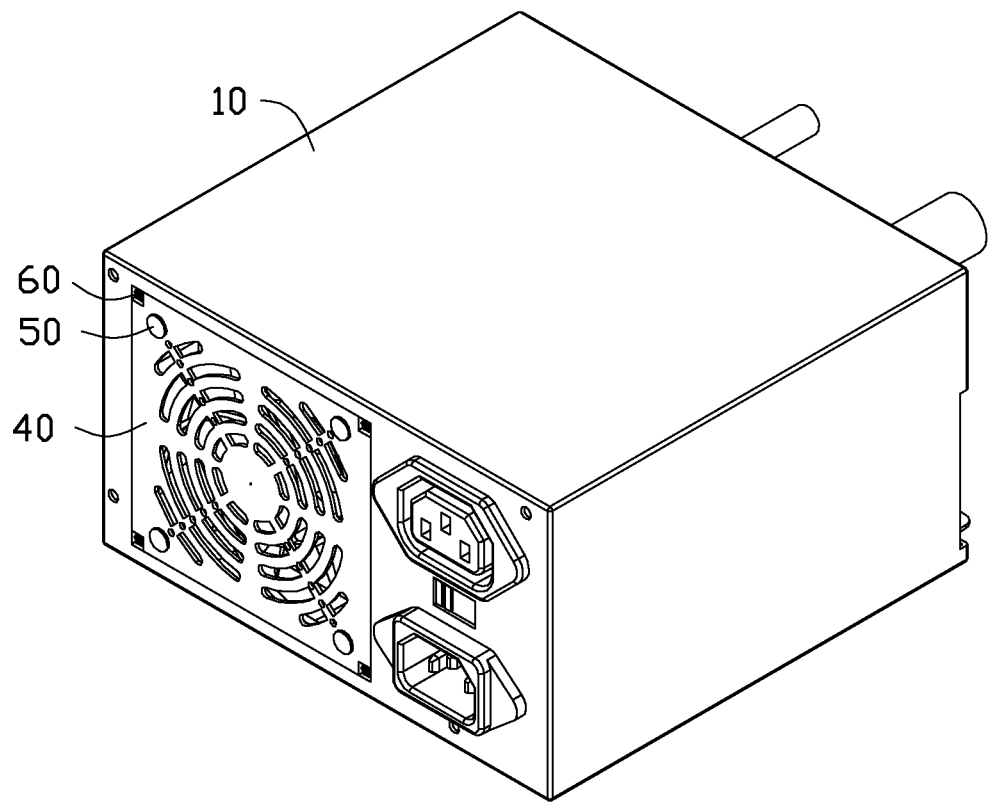
FIG. 3 is an assembled, isometric view of FIG. 1.

Referring to FIG. 3, in assembly, the mounting holes 320 of the second side of the fan 30 are aligned with a corresponding one of the groups of the first through holes 44. The shafts 52 with the flanges 56 of the fasteners 50 extend through the corresponding first through holes 44 and the mounting holes 320 of the second side of the shell 32, in that order. The fastening portions 54 of the fasteners 50 resist against the mounting bracket 40, and the flanges 56 resist against the second side of the shell 52. Thereby, the fan 30 is mounted to an inner side of the mounting bracket 40. The fan 30 enters the main body 10 through the opening 140 and is electrically connected to the connector 20. The mounting bracket 40 covers the opening 140, and the second through holes 460 of the mounting bracket 40 are aligned with the mounting holes 144 of the main body 10. The second fasteners 60 extend through the second through holes 460 to engage in the mounting holes 144 to mount the mounting bracket 40 to the main body 10.

In use, when the fan 30 needs to be removed from the main body 10, the second fasteners 60 are disassembled to separate the mounting bracket 40 and the fan 30 from the main body 10. The first fasteners 50 are ready to be released to separate the fan 30 from the mounting bracket 40.

It is believed that the present embodiment and its advantages will be understood from the foregoing description, and it will be apparent that various changes may be made thereto without departing from the spirit and scope of the description or sacrificing all of their material advantages, the example hereinbefore described merely being exemplary embodiment.

What is claimed is:

1. A power supply comprising:
a main body defining an opening therein;
a mounting bracket detachably mounted to the main body to cover the opening; and
a fan mounted on the mounting bracket and received in the main body through the opening;
wherein the fan comprises a shell and a plurality of blades mounted in the shell, four corners of a side of the shell each define a first mounting hole, the mounting bracket is substantially rectangular, and defines a plurality of groups of first through holes arranged in a cross from a center of the mounting bracket to four corners of the mounting bracket, four first fasteners extend through one group of the first through holes of the mounting bracket and the first mounting holes of the fan to mount the fan to the mounting bracket;
wherein four corners of the mounting bracket are recessed to form four recessed portions, each recessed portion defines a second through hole, the main body comprises a bottom plate, and a lateral plate substantially perpendicularly extending from a side of the bottom plate, the opening is defined in the lateral plate, four mounting pieces are formed on four corners of the opening, each mounting piece is recessed from the lateral plate, and defines a second mounting hole, four second fasteners extend though the second through holes of the mounting bracket and the second mounting holes of the mounting pieces of the main body, to mount the mounting bracket to the main body.

2. The power supply of claim 1, wherein each first fastener is made of elastic material, and comprises a shaft, a fastening portion extending from one end of the shaft, and a tapered flange extending from a circumference of the shaft, the shafts with the flanges of the first fasteners extend through the first through holes of the mounting bracket and the first mounting holes of the fan, the fastening portions resist against the mounting bracket, and the flanges resist against the side of the shell.

3. The power supply of claim 1, wherein a circuit board is received in the main body, and supported on the bottom plate, a connector is installed on the circuit board to be electrically connected to the fan.

4. The power supply of claim 1, wherein the mounting bracket defines a plurality of vents.

\* \* \* \* \*